United States Patent
Sy

(10) Patent No.: US 7,231,360 B2
(45) Date of Patent: Jun. 12, 2007

(54) TIME-BASED SOFTWARE LICENSING APPROACH

(76) Inventor: Bon K. Sy, 101-22 80th St., Ozone Park, NY (US) 11416

( * ) Notice: Subject to any disclaimer, the term of this patent is extended or adjusted under 35 U.S.C. 154(b) by 552 days.

(21) Appl. No.: 09/989,932

(22) Filed: Nov. 21, 2001

(65) Prior Publication Data

US 2002/0120578 A1   Aug. 29, 2002

Related U.S. Application Data

(60) Provisional application No. 60/252,668, filed on Nov. 22, 2000.

(51) Int. Cl.
G06Q 99/00 (2006.01)
H04K 1/00 (2006.01)

(52) U.S. Cl. ............... 705/29; 705/51; 705/52; 705/53; 705/57; 705/59; 726/26; 713/167; 713/176

(58) Field of Classification Search ............... 705/26, 705/50, 51, 57, 58, 59
See application file for complete search history.

(56) References Cited

U.S. PATENT DOCUMENTS

| | | | |
|---|---|---|---|
| 5,629,980 A * | 5/1997 | Stefik et al. ............... | 705/54 |
| 5,761,308 A * | 6/1998 | Torii et al. ............... | 705/52 |
| 5,774,652 A * | 6/1998 | Smith ............... | 726/20 |
| 6,185,414 B1 * | 2/2001 | Brunner et al. ............... | 455/406 |
| 6,334,118 B1 * | 12/2001 | Benson ............... | 705/52 |
| 2001/0037263 A1 * | 11/2001 | Hirota et al. ............... | 705/26 |
| 2001/0037450 A1 * | 11/2001 | Metlitski et al. ............... | 713/152 |
| 2002/0022971 A1 * | 2/2002 | Tanaka et al. ............... | 705/1 |
| 2002/0161718 A1 * | 10/2002 | Coley et al. ............... | 705/59 |
| 2002/0162008 A1 * | 10/2002 | Hill ............... | 713/200 |
| 2003/0088516 A1 * | 5/2003 | Remer et al. ............... | 705/59 |

FOREIGN PATENT DOCUMENTS

WO   WO 2004042515 A2 *   5/2004

* cited by examiner

*Primary Examiner*—Firmin Backer

(57) ABSTRACT

The present invention is directed to a time-based licensing scheme for software deployment. According to an aspect of the present invention, lime-based software can be disseminated through various channels, for example, a network, CD's, floppy disks, etc., but before the time-based software can be launched, a user needs to supply account information as well as an amount of time requested for using the time-based software.

In another aspect, the time-based software communicates with an authentication server preferably over a network to ascertain if the user is authorized and if the amount of time requested is approved. If the user is approved, the time-based software will be activated for the amount of time requested. If there is no time credit left in the user account, the user will not be approved and a rejection message will be sent to the user. Advantageously, the present invention allows for no restriction on where, when, or how many copies of the time-based software are used, as long as the user maintains sufficient time credit in the authentication server.

29 Claims, 5 Drawing Sheets

TIME-BASED SOFTWARE LICENSING APPROACH

The present application claims priority from U.S. Provisional Application Ser. No. 60/252,668 entitled "Time-based Software Licensing Approach" filed on Nov. 22, 2000, which is incorporated herein by reference.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent files or records, but otherwise reserves all copyright rights whatsoever.

BACKGROUND

1. Technical Field

The present invention relates generally to a system and method for controlling access to software. More specifically, the invention relates to a system and method for time-based software deployment and licensing through, for example, the Internet.

2. Description of Related Art

As the development of software increases, a common issue that arises are means of software deployment to end users. One method of deployment involves distributing commercial software in CDs or floppy disks. With this method of deployment, the copyright protection and commercial software licenses are traditionally enforced by limiting the installation of a single copy of software to one machine per each software license. If one wishes to use the same software in another machine, one must uninstall the software from one machine before it can be installed into another machine. To prevent multiple installations using a single license, a "key" may be assigned for installation, and registration may require the serial number of a machine or a computer network card. One example of software deployed in this way is Microsoft Office 2000.

Another commonly used approach for deploying software is software deployment through the Internet. Common technology used for Internet-based software deployment includes the use of programming languages such as Java for building cross-platform, Internet deliverable applications, or the use of Active X technology that is language independent but platform specific. A well-known example of Internet-based software deployment based on ActiveX is the Internet Explorer 4.0 and 5.0 which is downloadable and can be automatically installed into a Windows system. In this approach, one can visit, for example, a Microsoft web site using Netscape or an earlier version of Internet Explorer such as IE 3.0 to automatically download and install IE 4.0 or 5.0.

However, when software is distributed over the Internet, it becomes more difficult to enforce software licensing. Indeed, license-based access control is still in its infancy. Currently there are two common approaches for enforcement of software licenses deployed through the Internet. One approach involves requiring a potential software user to register and to obtain privilege access (through for example, username/password login) to a secured software depository site for software download from the Internet. In other words, access control is built in the software depository site domain level, not the level of software itself. However, this approach has the disadvantage of having no control over access to specific software once a user gains access to a software depository site.

Another approach involves allowing public software downloads, but having the software expire within a certain period of time once it is activated for use. Thus, a license is given for a fixed period of time. This is referred to as "period based" software. For example, Rational Enterprise will set a 21-day trial period before the software will disable itself. Such a deployment model, however, poses two problems. First, it does not prevent the same user from using a different computer to install an additional copy of the software, i.e., one can always download another copy of the software and install it into another machine when one copy of the period based software expires. Second, once the "time clock" starts, a user loses the opportunity to utilize the software once the time expires, even if (s)he does not even actually use the software during that trial time period (much like renting a video for a three-day period but never actually getting to watch the video during that period).

Accordingly, an efficient, accurate and effective technique for deploying and licensing software to users while avoiding the problems of the prior art, is highly desirable.

SUMMARY OF THE INVENTION

The present invention is broadly directed to a time-based licensing scheme for software deployment, wherein a time-based software deployment model enables software to be distributed, for example, over the Internet, but "charges" its users only the time (s)he is using the software.

According to an aspect of the present invention, client software can be downloadable through, for example, a network, CD's, floppy disks, etc., but before the software can be launched, a user needs to supply his/her account information as well as an amount of time requested for using the client software.

When the user supplies his/her account information and a time request, the client software will then communicate with its authentication server preferably over a network (e.g., the Internet). If the user is authorized and the amount of time requested is approved by checking against the find availability (e.g., in terms of time) of the user account which is preferably stored on the authentication server side, the software will be activated for the amount of time requested. If the time left in the user account is less than the amount requested, the amount of time granted would be the same as the time credit left in the user account. If there is no time left in the user account, a rejection message will be sent to the user.

If the software is activated, the user will then be permitted to use the software for the amount of time approved. At this point, the computer can be disconnected from the network. If the user does not use the entire amount of time granted, the remaining amount of time is preferably credited back to the authentication server (by, for example, connecting back to the network).

In one aspect of the present invention, a method for licensing time-based software is provided comprising the steps of: loading time-based software onto a client machine, wherein said time-based software submits user information to an authentication server through a network; determining if the user is approved, wherein if the user is approved, further comprising the step of: the authentication server activating the time-based software for an amount of time approved.

In another aspect of the present invention, a system for licensing time-based software is provided comprising a time-based software loaded onto a client machine; and an authentication server for receiving user information from said time-based software, wherein said authentication server determines if a user is approved, wherein if the user is approved, the authentication server activates the time-based software for an amount of time approved.

These, and other aspects, features and advantages of the present invention will be described or become apparent from the following detailed description of the preferred embodiments, which is to be read in connection with the accompanying drawings.

DETAILED DESCRIPTION OF PREFERRED EMBODIMENTS

It is to be understood that the exemplary system modules and method steps described herein may be implemented in various forms of hardware, software, firmware, special purpose processors, or a combination thereof. Preferably, the present invention is implemented in software as an application program tangibly embodied on one or more program storage devices. The application program may be executed by any machine, device or platform comprising suitable architecture. It is to be further understood that, because some of the constituent system modules and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate or practice these and similar implementations or configurations of the present invention.

The present invention comprises a time based licensing approach for software deployment. Advantageously, a user can download time-based software from a public domain without the need of gaining privilege access to a secured site. In association with the time-based software, a time based credit history is preferably maintained in a remote server (authentication server). A user will only be "charged" for the time that the time-based software is actually used, irrespective of when or where the time-based software is used. In other words, the use of the time-based software is granted for use on the basis of actual time usage, instead of a fixed period of time or the number of copies of software installed in a specific machine(s). Advantageously, the user can use the time-based software when it is most convenient for him/her to do so, and can also manage/budget the amount of time he/she desires to use the time-based software.

Thus, time based software according to the present invention is granted for use on the basis of the amount of time one is approved for using the software. The software user can use the time-based software from any machine that permits software download from, for example, the Internet with execution privilege. In other words, there is no restriction on where, when, or how many copies of the time-based software are used, as long as the user has sufficient "time credit" in the authentication server.

Figure 1A:
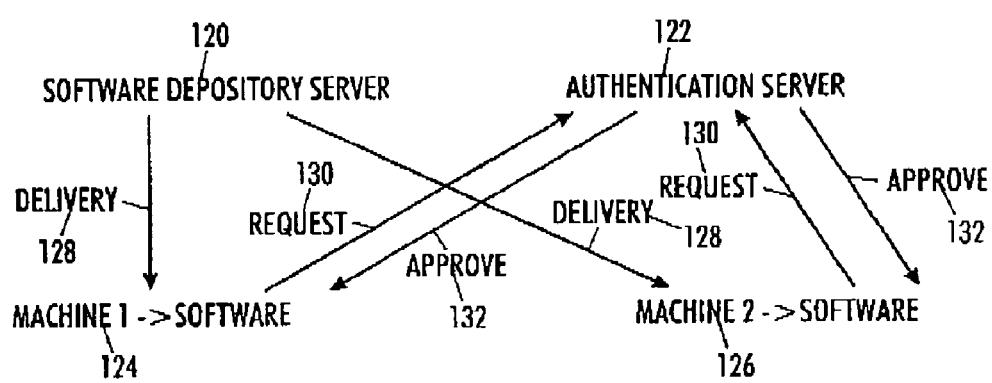
FIG. 1A illustrates an overall process of time based software dissemination and deployment through a network according to an aspect of the present invention.

FIG. 1A illustrates an overall process of time based software dissemination and deployment through a network according to an aspect of the present invention. In a preferred embodiment of the time based software deployment approach, two servers are involved: one server (e.g., software depository server 120) disseminates time-based software, and a second server (e.g., authentication server 122) provides service access to the downloaded time-based software. Here, FIG. 1A illustrates an exemplary setup involving two machines 124 and 126. Once the time-based software is downloaded successfully (step 128) onto a client (user) machine (e.g., 124 or 126), the client machine preferably remains connected to the network for requesting (step 130) and getting approval (step 132) from the authentication server 122 for using the software. It is to be noted that the time-based software in the present invention may comprise any type of software program which preferably includes, for example, code for enabling the time-based license approach. In addition, it is to be noted that a user may use any machine connected to a network (e.g., the Internet) to download the time-based software from a software depository server. In addition, the time-based software can be disseminated through other means of distribution, e.g., by CDs, floppy disks, etc.

Figure 1B:
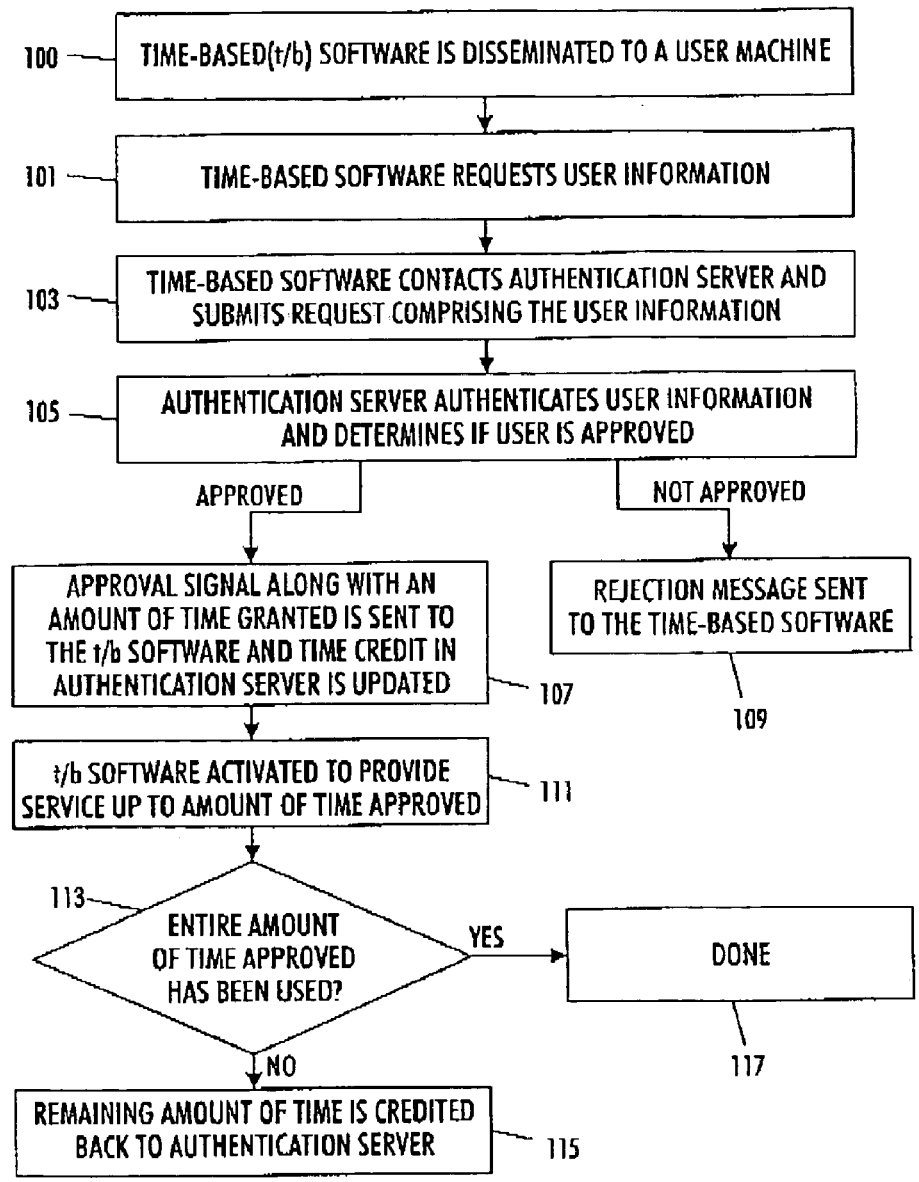
FIG. 1B illustrates an exemplary flow chart depicting a method for deploying time-based software according to an aspect of the present invention.

FIG. 1B illustrates an exemplary flow chart depicting a method for deploying time-based software according to an aspect of the present invention. Initially, time-based software (i.e., executable machine code) is disseminated to a user machine (step 100). It is to be noted that the time-based software may comprise any type of software which also includes, e.g., code for enabling the software to communicate with the authentication server (thus enabling the time-based license approach). The software can be disseminated through, for example, a network (e.g., the Internet) from a software depository server, or by way of CDs, floppy disks, etc. It is to be noted that any channel which enables dissemination of software can comprise a software depository server (e.g., any web server, FTP server, etc.). In a preferred embodiment, a software depository server may comprise, for example, an Apache web server installed in a Linux system.

Once the time-based software is downloaded to a user's machine, the time-based software will ask the user for, for example, user information (step 101). The user information may comprise, for example, a username of the user account, a password for the user account, and an amount of time requested (e.g., in minutes) for using the software. The time-based software will then contact the authentication server through, for example, a network (e.g., the Internet) and submit a request comprising the user information (step 103). It is to be noted that along with the request, the authentication server preferably also receives order information which may comprise, for example, the time-based software product ID and a client machine IP address.

It is to be additionally noted that the authentication server stores user information for comparison with the incoming user information given by the time-based software. The user information may be stored, for example, in a plain ASCII text file in the authentication server.

Next, the authentication server preferably authenticates the submitted user information by checking it against the user information stored in the authentication server to determine if the user is approved for using the time-based software for the amount of time requested (step 105). If the time credit of a user's account exceeds the amount of time requested, the amount of time requested will be approved; if the time credit is less than the amount of time requested, the amount of time approved would be the same as the time credit left in the user's account. Thus, if a non-zero amount of time is granted, an approval signal along with the amount of time granted will be sent back to the time-based software and the time credit on the authentication server side will be updated to reflect a current amount of time left, if any (step 107). If there is no time credit left when a request for time is made, or if the user is otherwise not approved for using the software, a rejection message will be sent back to the software (step 109).

If the user is approved, the time-based software will receive the approval signal and the time-based software will be activated for the amount of time approved (step 111). It is to be noted that at this point, the user's machine can be disconnected from the network (e.g., go offline). In decision step 113, it is preferably determined whether the entire amount of time approved has been used by the user. If so, the system is done (step 117). If the user does not use the entire amount of time approved, any remaining time may be re-deposited by the user back to his/her user account (step 115). This is preferably done, for example, by connecting to the network so that the time-based software may contact the authentication server to credit any remaining time back to the user account.

Advantageously, there are two important characteristics of the deployment model according to the present invention. First, a user only "pays" for the actual amount of time being used, rather than a block of pre-specified amount of time. Second, since the account information is kept on the server side, a user can access the time-based software in different locations using different machines.

Figure 2:
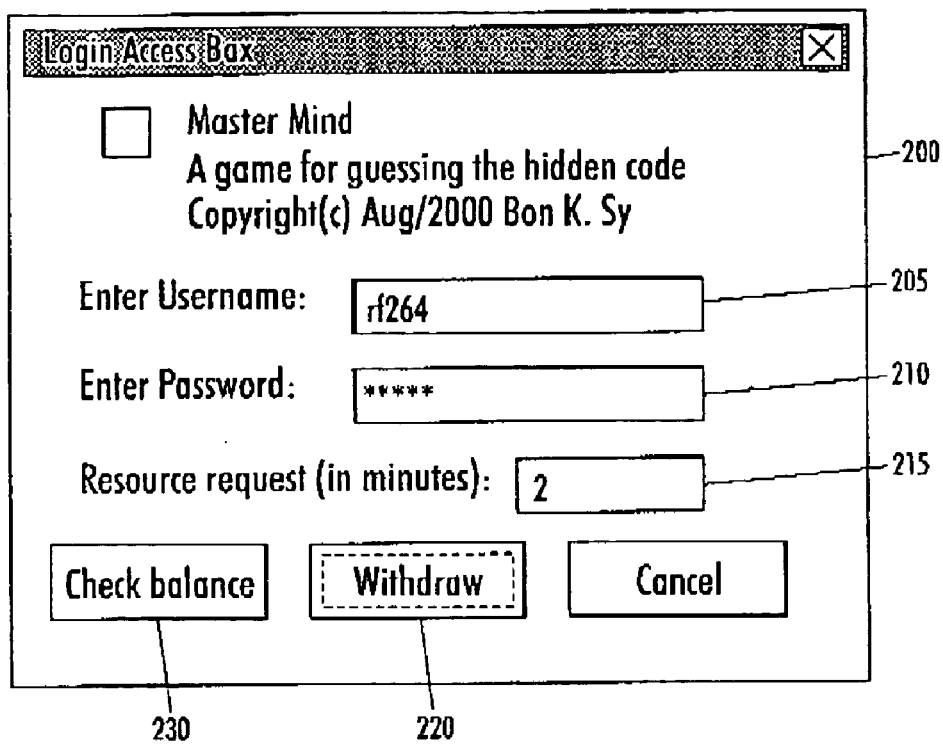
FIG. 2 illustrates an exemplary log-in access box which is preferably displayed by the time-based software to request user information from a user.

FIG. 2 illustrates an exemplary login access box 200 which preferably is displayed by the time-based software to request user information according to an aspect of the present invention. The user can provide a username 205, a password 210, and a resource request 215 for entering an amount of time the user desires to use the software. Upon entering the user information, the user can click on a withdraw button 220 to withdraw an amount of time requested for using the software. The login access box 200 also preferably includes a balance checking button 230 for allowing the user to check the total amount of time remaining in his account in which the time-based software is granted for use. When the user clicks on the balance checking button 230, the time-based software checks the time remaining in the user account by preferably connecting to the network to communicate with the authentication server.

Figure 3:
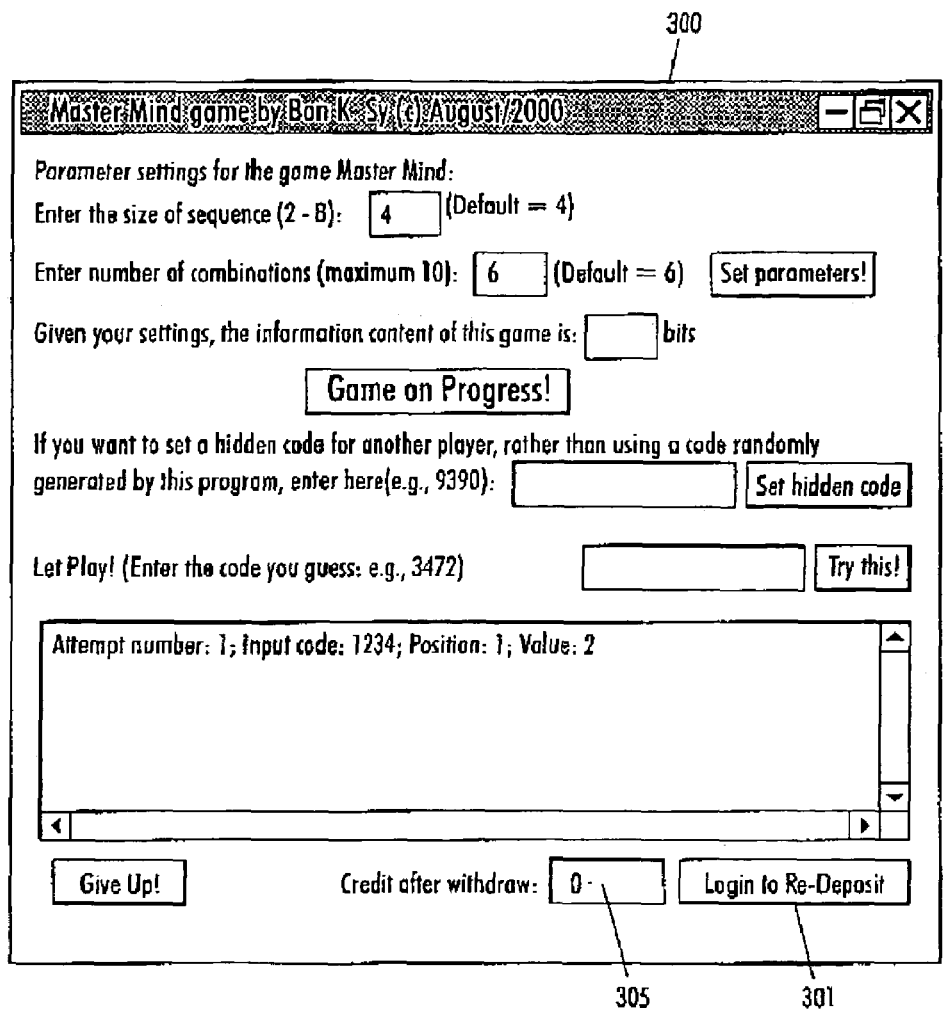
FIG. 3 depicts an exemplary window including a "Login to Re-deposit" button for allowing a user to connect back to a network to re-deposit any unused time back into his/her time credit.

FIG. 3 depicts an exemplary window 300 preferably displayed by time-based software according to an aspect of the present invention, wherein the window comprises a "Login to Re-deposit" button 301 for allowing a user re-deposit any unused time back into his/her account by connecting back to, for example, the network. The window 300 also preferably includes a credit box 305 for indicating the time credit the user has remaining after withdrawal and use of the requested amount of time.

A preferred embodiment of the time-based licensing model as disclosed in the present invention utilizes, for example, ActiveX (COM) technology developed by Microsoft for client software and authentication server communication. Additionally, this can also be achieved by simply a simple UDP communication that is readily available in standard Java network programming library.

Thus, one embodiment of the time based software deployment process according to the present invention comprises three major components. The first major component is the software depository server. The second component is the authentication server. The third component is the "time based" software downloadable to a user's client machine.

It is to be noted that implementations of an authentication server may comprise various approaches; for example, Microsoft's DCOM (Distributed Component Object Model) for ActiveX control application, and Cobra technology for both Microsoft and Unix platforms. One embodiment of the authentication server may comprise, for example, an implementation based on Borland's component technology available for C++ and Delphi programming.

In Borland's component technology, there is a dual pair of components: TNMMsg and TNMMsgServ. The purpose of the TNMMsg component is to send simple ASCII text messages across the Internet or an intranet using the TCP/IP protocol. In using the TNMMsg component, it must be paired with the TNMMsgServ component to provide a 2-way communication. The use of this component requires a 32-bit Winsock stack, WSOCK32.DLL, which is available from many vendors, and is included in Windows operating systems.

An authentication server based on TNMMsg and TNMMsgServ can serve as a listener, for example, using TNMMsgServ. One implementation, for example, is to have TNMMsgServ listening at port 7221. When a time based software contacts the authentication server, the authentication server will authenticate and verify against the user information stored in a plain ASCII text file in the server machine. An appropriate decision—either deny service request or approve service request with an approved amount of time (as described in steps 109 and 107, respectively, of FIG. 1B)—will be sent back to the time based software in a remote client machine using TNMMsg. One implementation, for example, is to have TNMMsg use port 1227 for communicating with the client time based software.

When a time-based software contacts an authentication server, the TNMMsgServ component preferably will receive, for example, the following information:
1. Username of a user account
2. Password of a user account
3. Software product ID
4. Amount of time requested for service
5. Client machine IP address For replying to a service request, the TNMMsg of an authentication server preferably uses port 1227, and the "Host" property will preferably be set to the remote host of the time based software (based on the IP address of the client machine). The "PostIt" method of TNMMsg component is used by an authentication server to send the reply. In addition, an authentication server can also identify itself, for example, as a "Log Server" via the "FromName" property of TNMMsg component. In doing so, the client time based software can authenticate the source of the reply.

The following three lines is an exemplary implementation of the communication process, for example, in C++ programming, for enabling an authentication server to reply to a request of a client time-based software:

```
NMMsg1->Host = rcd.location;   //client IP
NMMsg1->FromName= "Log Server ";
NMMsg1->PostIt(reason);        //"reason" is either service denial or
                               //approval with amount of time granted
```

The time-based software comprises two segments of code to be inserted for enabling the time based license approach in client software. The first segment of code is for a time-based software to contact the authentication server. Again, TNMMsg and TNNMsgServ components are used in the time based software. The IP address of the client machine hosting time-based software is automatically identified through the "LocalIP" property of the TNMMSGServ component. In one embodiment, the authentication server can be hosted by, for example, the machine "TSMACH248," and the site "techsuite.net". Preferably, the user information (comprising a username, password, time request) along with, for example, a software product serial ID is combined into a single ASCII text message as "transmit" and sent over to the authentication server.

The following three lines is an exemplary implementation of a communication process, for example, in C++ programming, for time based software according to the present invention to contact an authentication server:

```
NMMsg1->FromName = NMMSGServ1->LocalIP;
NMMsg1->Host="TSMACH248.techsuite.net";
NMMsg1->PostIt(transmit);   //"transmit" encodes the information of
                            //username, password, time request, and
                            //software product serial ID
```

It is to be noted that in this implementation of time-based software, the ports set for TNMMsg and TNMMsgServ components to contact an authentication server are preferably 7221 and 1227 respectively. Note that the port set for TMMsg (in this case 7221) of time based software is the same as the port set for listening by TNMMsgServ component of the authentication server. Similarly, the port set for TNMMsgServ of time-based software to listen to the reply of an authentication server (in this case 1227) is preferably the same as that of the TNMMsg of the authentication server.

The second segment of code (shown below) preferably inserted in the time-based software deals with, for example, monitoring the amount of time elapsed since the software service begins. At the beginning of the service, the software preferably reads the system time as a reference. An exemplary C++ programming code segment for reading reference time is shown below:

```
//---- Check approval and set reference time -----
if (flag == -1)       // "flag" is initialized to -1 initially so that the
                      reference time
{                     // is set once ONLY right after the service starts
    ftime(&reftime);  // Get reference time from client system
    flag = 1;
    Edit4->Text = FloatToStr(credit);
}
```

As time passes by, the system time is preferably re-read. The elapsed time is calculated and checked against the amount of time granted for a service. A time-out message will be displayed if the elapsed time exceeds the amount of time granted for service. An exemplary C++ programming code for getting a current time from the system and checking the elapsed time-is shown below:

```
//---------- Check Time Out, monitor periodically ------------------------
    ftime(&t);        //get current time during software is running to
                      provide service
    if (approve*60 < (t.time − reftime.time))   //approval time "approve"
                                                is in min
    {                                           //current and reference
                                                time, and
                                                //their difference, are in
                                                seconds.
        ShowMessage("Run Out of budget!");      //show run out of time
                                                and stop
        return;
    }
//---------- End Check Time Out ----------------------
```

Figure 4:
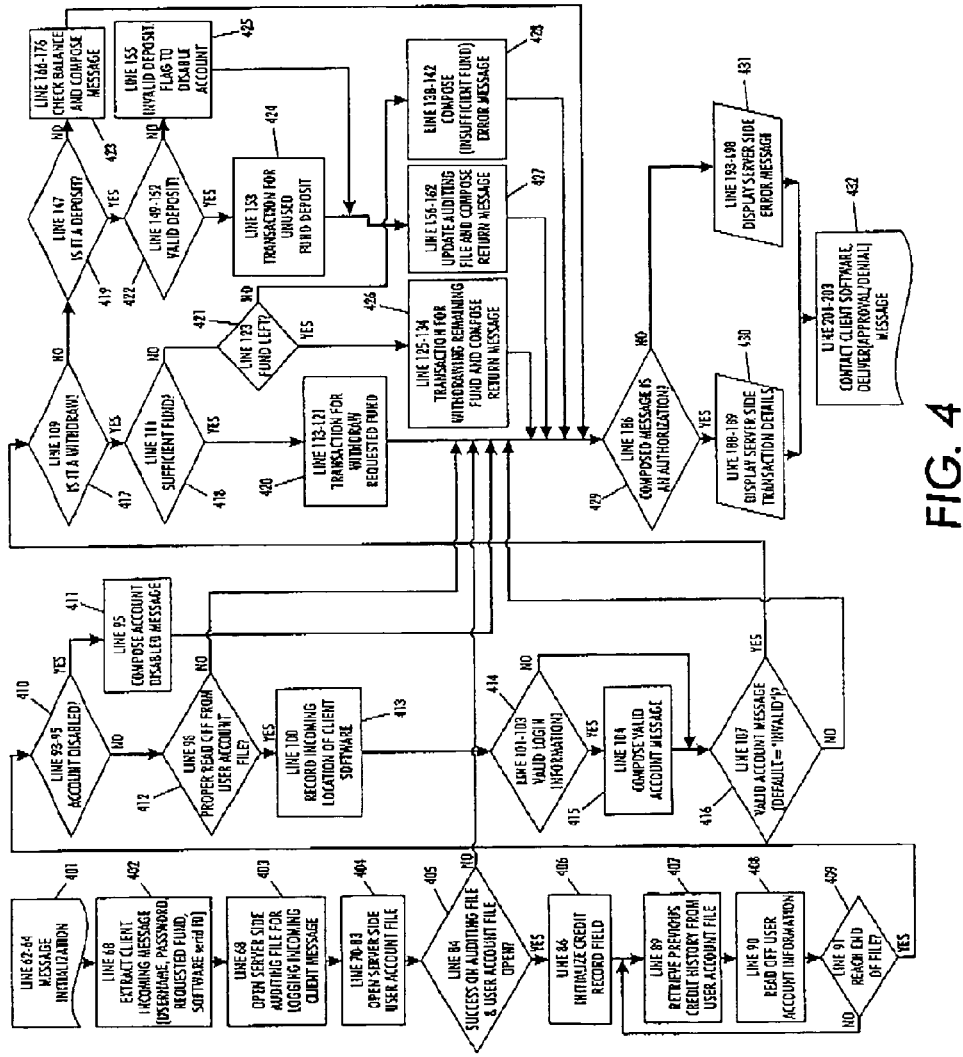
FIG. 4 illustrates an illustrative flow diagram depicting an exemplary process implemented by an authentication server according to an aspect of the present invention.

The following is an exemplary source code for an authentication server according to an aspect of the present invention, which is described further by FIG. 4:

```
© 2000 Bon K. Sy
Line
  1    /*
  2
  3    sMsg sends back the following information:
  4
  5    If approved, then approved time > 0 :
  6        Approved time : Credit left : Username : Password
  7    If insufficient budget:
  8        −1 : −1 : Username : Password
  9    If re-deposit, deposit time < 0 :
 10        Deposit time : Credit after re-deposit : Username :
       Password
 11    */
 12
 13    //------------------------------------------------------------

14    #include <vcl.h>
 15    #include <math.h>
```

-continued

```
16  #include <stdio.h>
17  #include <fcntl.h>
18  #include <io.h>
19  #pragma hdrstop
20
21  #include "Unit1.h"
22  //---------------------------------------------------------------
23  #pragma package(smart_init)
24  #pragma resource "*.dfm"
25  TForm1 *Form1;
26  //---------------------------------------------------------------
27  __fastcall TForm1::TForm1(TComponent* Owner)
28          : TForm(Owner)
29  {
30  }
31  //---------------------------------------------------------------
32
33  void __fastcall TForm1::NMMSGServ1MSG(TComponent *Sender,
34          const AnsiString sFrom, const AnsiString sMsg)
35  {
36      typedef struct{
37          char username[32];
38          char password[32];
39          float credit;
40          char rcdate[16];
41          char rctime[16];
42          char location[15];
43          char serialid[32];
44  } Record;
45
46      Record rcd;
47      long pos;
48      long curpos;
49      char tem[64], daytime[2];
50
51      AnsiString reason = "-User not found!";
52      char infile[32], productid[32];
53      char msg[8];
54      char userid[32]="";
55      char passwd[32] = "";
56      float timeblock = 0;
57      float prev_time;
58      int flag;
59      int no_error = 1;
60      int handle;
61
62      //Initialization
63      strcpy(msg, "INVALID");
64      //Initialization ends
65
66      sscanf(sMsg.c_str(), "%s %s %f %s", userid, passwd, &timeblock, productid);
67
68      FILE *fp1 = fopen("loginfor.dat", "a+");
69
70      strcpy(infile, userid);
71      strcat(infile, ".dat");
72
73      if ((handle = open(infile, O_CREAT | O_TEXT)) == -1)
74      {
75          no_error = 0;
76      }
77      else
78      {
79          if (filelength(handle) == 0) no_error = 0;
80          close(handle);
81      }
82
83      FILE *fp = fopen(infile, "a+");
84      if (no_error && fp && fp1)
85      {
86          rcd.credit = -1;
87          do
88          {
89              prev_time = rcd.credit;
90              flag = fscanf(fp, "%s %s %f %s %s %s %s\n",
```

-continued

```
rcd.username, rcd.password, &rcd.credit, rcd.rcdate, rcd.rctime,
rcd.location, rcd.serialid);
 91            } while (!(feof(fp)));
 92
 93            if (prev_time == −1) prev_time = rcd.credit;
 94
 95            if (rcd.credit == −1) reason = "Account disabled!";
 96            else
 97            {
 98                if (flag == 7)
 99                {
100                    StrCopy(rcd.location, sFrom.c_str());
101                    if (strcmp(rcd.username, userid) == 0)
102                    {
103                        if (strcmp(rcd.password, passwd) == 0)
104                            strcpy(msg, "OK")
105                    }    // default msg = "INVALID"
106
107                    if (strcmp(msg, "OK") == 0)
108                    {
109                        if (timeblock < 0)
110                        {
111                            if (rcd.credit >= fabs(timeblock))
112                            {
113                                StrCopy (tem,
DateTimeToStr(Now()).c_str());
114                                sscanf(tem, "%s %s %s", rcd.rcdate,
rcd.rctime, daytime);
115                                StrCat(rcd.rctime, daytime);
116                                rcd.credit += timeblock;
117                                reason = "+" +
FloatToStr(fabs(timeblock)) + " : " + FloatToStr(rcd.credit) + " : " +
rcd.username + " : " + rcd.password;
118                                fseek(fp, 0L, SEEK_END);
119                                fprintf(fp, "%s %s %10.2f %s %s %s
%s\n", rcd.username, rcd.password, rcd.credit, rcd.rcdate, rcd.rctime,
rcd.location, productid);
120                                fseek(fp1, 0L, SEEK_END);
121                                fprintf(fp1, "%s %s %10.2f %s %s %s
%s\n", rcd.username, rcd.password, rcd.credit, rcd.rcdate, rcd.rctime,
rcd.location, productid);
122                            }
123                            else if (rcd.credit > 0)
124                            {
125
StrCopy(tem,DateTimeToStr(Now()).c_str());
126                                sscanf(tem, "%s %s %s",
rcd.rcdate, rcd.rctime, daytime);
127                                StrCat(rcd.rctime, daytime);
128                                reason = "+" +
FloatToStr(rcd.Credit) + " : 0 " + " : " + rcd.username + " : " +
rcd.password;
129                                rcd.credit = 0;
130                                fseek(fp, 0L, SEEK_END);
131                                fprintf(fp, "%s %s %10.2f %s %s %s %s\
n", rcd.username, rcd.password, rcd.credit, rcd.rcdate,
rcd.rctime, rcd.location,productid);
132
133                                fseek(fp1, 0L, SEEK_END);
134                                fprintf(fp1, "%s %s %10.2f %s %s
%s %s\n", rcd.username, rcd.password, rcd.credit, rcd.rcdate,
rcd.rctime, rcd.location, productid);
135                            }
136                            else
137                            {
138                                reason = "−1 : −1";
139                                StrCat(reason.c_str(), " : ");
140                                StrCat(reason.c_str(),
rcd.username);
141                                StrCat(reason.c_str(), " : ");
142                                StrCat(reason.c_str(),
rcd.password);
143                            }
144                        }
145                        else
146                        {
147                            if (timeblock > 0)
148                            {
149                                StrCopy(tem,
```

-continued

```
DateTimeToStr(Now()).c_str());
150                           sscanf(tem, "%s %s %s", rcd.rcdate,
rcd.rctime, daytime);
151                           StrCat(rcd.rctime, daytime);
152                           if (((rcd.credit + timeblock) <=
prev_time) && (rcd.credit != −1))
153                               rcd.credit += timeblock;
154                           else
155                               rcd.credit = −1;
156                           fseek(fp, 0L, SEEK_END);
157                           fprintf(fp, "%s %s %10.2f %s %s %s
%s\n", rcd.username, rcd.password, rcd.credit, rcd.rcdate, rcd.rctime,
rcd.location, productid);
158                           reason = "−" + FloatToStr(timeblock)
+ " : " + FloatToStr(rcd.credit) + " : " + rcd.username + " : " +
rcd. password;
159
160                           curpos = ftell(fp1);
161                           fseek(fp1, 0L, SEEK_END);
162                           fprintf(fp1, "%s %s %10.2f %s %s %s
%s\n", rcd.username, rcd.password, rcd.credit, rcd.rcdate, rcd.rctime,
rcd.location, productid);
163                       }
164                       else
165                       {
166                           StrCopy(productid, "CHECK_BALANCE");
167                           StrCopy(tem,
DateTimeToStr(Now()).c_str());
168                           sscanf(tem, "%s %s %s", rcd.rcdate,
rcd.rctime, daytime);
169                           StrCat(rcd.rctime, daytime);
170                           fseek(fp, 0L, SEEK_END);
171                           fprintf(fp, "%s %s %10.2f %s %s %s
%s\n", rcd.username, rcd.password, rcd.credit, rcd.rcdate, rcd.rctime,
rcd.location, productid);
172                           reason = "−"+FloatToStr(timeblock)+"
: " + FloatToStr(rcd.credit) + " : " + rcd.username + " : " +
rcd.password;
173
174                           curpos = ftell(fp1);
175                           fseek(fp1, 0L, SEEK_END);
176                           fprintf(fp1, "%s %s %10.2f %s %s %s
%s\n", rcd.username, rcd.password, rcd.credit, rcd.rcdate, rcd.rctime,
rcd.location, productid);
177                       }
178                   }
179               }
180           }
181       }
182       fclose(fp);
183       fclose(fp1);
184   }
185
186   if (strcmp(msg, "OK") == 0)
187   {
188       Memo1->Lines->Add((AnsiString) rcd.location+"
"+(AnsiString) rcd.rcdate+" "+(AnsiString) rcd.rctime);
189       Memo1->Lines->Add("    "+(AnsiString) rcd.username+"
"+(AnsiString) FloatToStr(rcd.credit)+" || Withdraw/Deposit:
"+(AnsiString) FloatToStr(timeblock));
190   }
191   else
192   {
193       StrCopy(rcd.location, sFrom.c_str());
194       StrCopy(tem, DateTimeToStr(Now()).c_str());
195       sscanf(tem, "%s %s %s", rcd.rcdate, rcd.rctime, daytime);
196       StrCat(rcd.rctime, daytime);
197       Memo1->Lines->Add((AnsiString) rcd.location+"
"+(AnsiString) rcd.rcdate+" "+(AnsiString) rcd.rctime);
198       Memo1->Lines->Add((AnsiString) userid + " "+ (AnsiString)
passwd+" "+reason);
199   }
200
201   NMMsg1->Host = rcd.location;   //client IP
202   NMMsg1->FromName= "Log Server ";
203   NMMsg1->PostIt(reason);
204 }
205 //----------------------------------------------------------------------
```

FIG. 4 is an illustrative flow diagram depicting an exemplary process implemented by the authentication server according to an aspect of the present invention. It is to be noted that each step of FIG. 4 indicates the lines of the source code (shown above) which it refers to.

Steps 401–404 involve initializing and extracting an incoming message from a client machine, opening an authentication server side auditing file for logging the incoming message, and opening the server-side user account file. At step 405 it is determined if the auditing file and user account file could be opened successfully. If yes, then a credit record field is initialized (step 406). If no, then proceed to step 429, where it is determined if the message to be composed will be an authorization. If it will be an authorization, then the authentication server side transaction details will be displayed (step 430) and the client (time-based) software will be contacted to deliver the approval message (step 432). If the composed message will not be an authorization, then a (authentication) server side error message will be displayed (step 431) and the client software will be contacted to deliver a denial message (step 432).

If the credit record is initialized (step 406), a previous credit history is then retrieved from the user account file (step 407) and the user account is read (step 408). In step 409, it is ascertained whether the end of the user account file is reached. If no, then go to step 407 and repeat. If yes, then proceed to step 410 in which it is determined whether the account is disabled. If yes, then an account disabled message is composed (step 411) and the system proceeds to step 429 (and repeats the process described above from step 429). If it is determined that the account is not disabled, then it is next ascertained whether there was a proper read-off from the user account file (step 412). If no, then the system proceeds to step 429. If yes, then the incoming location of the client time-based software is recorded (step 413).

Next, it is ascertained whether the log-information is valid (step 414). If yes, a valid account message is composed (step 415) and it is then determined if there is a valid account message (step 416). If no, the process goes directly from step 414 to step 416. If it is determined that the account message is valid, then it is next determined whether there is a withdrawal of time being requested (step 417). If yes, then it is determined whether the user has sufficient funds (e.g., in term of time) in the user account (step 418). If there are sufficient funds, then a transaction takes place for withdrawing the requested funds (step 420) and the process proceeds to step 429.

If there are insufficient funds, then it is determined if funds are left (step 421). If yes, then a transaction takes place for withdrawing remaining funds and composing a return message (step 426) and the system proceeds to step 429). If no, than an insufficient fund error message is composed (step 428) and the system proceeds to step 429.

If it is determined at step 417 that the message does not request a withdrawal of funds, then it is determined if the message is a deposit (step 419). If yes, then it is determined if it is a valid deposit (step 422). If it is valid, then a transaction takes place for depositing funds (step 424), and the auditing file is updated to reflect the new amount of funds available and a return message is composed (step 427). If at step 422 it is determined to not be valid, then there will be a flag to disable the account (step 425) and the system will proceed to step 427.

If at step 419 it is determined that a deposit is not being made, then the balance in the user account is checked and a message is composed (step 423) and the system then proceeds to step 429.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the present invention. All such changes and modifications are intended to be included within the scope of the invention as defined by the appended claims.

What is claimed is:

1. A method for licensing time-based software comprising the steps of: loading time-based software onto a client machine, wherein said time-based software requests user information including an amount of time requested by the user for using said time-based software and connects to an authentication server through a network and submits said user information to the authentication server; determining if the user is approved, wherein if the user is approved, further comprising the step of: the authentication server activating the time-based software for an amount of time approved; thereafter disconnecting from said authentication server, wherein if the user uses the time-based software for less than the amount of time approved, the user crediting any remaining amount of time back to the user's account located on the authentication server wherein the time-based software is configured to allow the user to check the total remaining time in his account via the time base software when it is reconnnected to the network to communicate with the authentication server.

2. The method of claim 1, wherein if the user is not approved, further comprising the step of sending a rejection message back to the software.

3. The method of claim 1, wherein the step of determining if the user is approved further comprises the steps of: matching the user information with a user account stored in said authentication server; and checking the user account for a time credit amount, wherein the user is approved if the user information matches the user account and the time credit amount is greater than zero.

4. The method of claim 1, wherein said user information includes a user name and a password.

5. The method of claim 1, wherein the network comprises the Internet.

6. The method of claim 4, wherein the step of the time-based software submitting user information to the authentication server further comprises submitting order information to the authentication server, said order information comprising a software product ID and a client machine IP address.

7. The method of claim 6, wherein the time-based software displays a log-in access box for requesting the user information, the log-in access box including a balance checking feature for allowing the user to check a total amount of time remaining in a user account.

8. The method of claim 1, wherein if the user is approved, further comprising the step of updating a time credit amount in the authentication server.

9. The method of claim 3, wherein if the time credit is greater than or equal to the amount of time requested, the amount of time approved comprises the amount of time requested.

10. The method of claim 3, wherein if the time credit is less than the amount of time requested, the amount of time approved comprises the time credit.

11. The method of claim 1, wherein the user is determined to be approved independent of a time and date the user makes The request for using said time-based software.

12. A program storage device readable by machine, tangibly embodying a program of instructions executable by machine to perform the method steps for licensing time-based software comprising the steps of: loading time-based software onto a client machine, wherein said time-based software requets user information including an amount of time requested by the user for using said time-based software and connects to an authentication server through a network and submits the user information to the authentication server; determining if the user is approved, wherein if the user is approved, further comprising the step of: the authentication server activating the time-based software for an amount of time approved; thereafter disconnecting from the authentication server, wherein if the user uses the time-based software for less than the amount of time approved, the user reconnecting the time-based software to the authentication server and crediting any remaining amount of time back to the user's account located on the authentication server wherein the time-based software is configured to allow the user to check the total remaining time in his account via the time based software when it is reconnected to the network to communicate with the authentication server.

13. The program storage device of claim 12, wherein the step of determining if the user is approved further comprises the steps of: matching the user information with a user account stored in said authentication server; and checking the user account for a time credit amount, wherein the user is approved if the user information matches the user account and the time credit amount is greater than zero.

14. The program storage device of claim 12, wherein said user information includes a user selected a user name and a user selected password.

15. The program storage device of claim 12, wherein the network comprises the Internet.

16. The program storage device of claim 12, wherein if the user is approved, further comprising the step of updating a time credit amount in the authentication server.

17. The program storage device of claim 12, wherein the step of the time-based software submitting user information to the authentication server further comprises submitting order information to the authentication server, said order information comprising a software product ID and a client machine IP address.

18. The program storage device of claim 12, wherein the time-based software displays a log-in access box for requesting the user information the log-in access box including a balance checking feature for allowing the user to check a total amount of time remaining in a user account.

19. The program storage device of claim 13, wherein if the time credit is greater than or equal to the amount of time requested, the amount of time approved comprises the amount of time requested.

20. The program storage device of claim 13, wherein if the time credit is less than the amount of time requested, the amount of time approved comprises the time credit.

21. A system for licensing time-based software comprising: a time-based software loaded onto a client machine for requesting user information from a user including an amount of time requested by the user for using said time-based software; and an authentication server for connecting to said time-based software and receiving said user information from said time-based software, wherein said authentication server determines if the user is approved, wherein if the user is approved, the authentication server activates the time-based software for an amount of time requested; thereafter disconnectin the time-based software from the authentication server, wherein the time-based software remains activated for the amount of time requested while disconnected from the authentication server, wherein if the user uses the time-based software for less than the amount of time requested, any remaining amount of time is credited back to the user's account located on the authentication server by the user reconnecting time based software to the authentication server and crediting the remaining amount of time, wherein the time-based software is configured to allow the user to check the total remaining time in his account via the time based software when it is reconnected to the network to communicate with the authentication server by the user reconnecting the time-based software to the authentication server and crediting the remaining amount of time.

22. The program storage device of claim 12, wherein the user is determined to be approved independent of a time and date the user makes the request for using said time-based software.

23. The system of claim 21, wherein the authentication server determines if the user is approved by matching the user information with a user account stored in said authentication server, and checking the user account for a time credit amount, wherein the user is approved if the user information matches the user account and the time credit amount is greater than zero.

24. The system of claim 21, wherein the authentication server further receives order information from the time-based software, said order information comprising a software product ID and a client machine IP address.

25. The system of claim 23, wherein the time-based software displays a log-in access box for requesting the user information, the log-in access box including a balance checking feature for allowing the user to check a total amount of time remaining in a user account.

26. The system of claim 25, wherein if the user is approved, further comprising the step of updating a time credit amount in the authentication server.

27. The system of claim 26, wherein if the time credit amount is greater than or equal to the amount of time requested, the amount of time approved consists of the amount of time requested.

28. The system of claim 27, wherein if the time credit amount is less than the amount of time requested, the amount of time approved comprises the time credit amount.

29. The system of claim 28, wherein the user is determined to be approved independent of a time and date the user makes the request for using said time-based software.

* * * * *